Oct. 25, 1966    M. R. RICE    3,280,480
MATHEMATICAL TEACHING AID
Filed Aug. 19, 1965    3 Sheets-Sheet 1

INVENTOR.
Madeline R. Rice
BY
Wood, Herron & Evans
ATTORNEYS

Oct. 25, 1966 M. R. RICE 3,280,480
MATHEMATICAL TEACHING AID
Filed Aug. 19, 1965 3 Sheets-Sheet 2
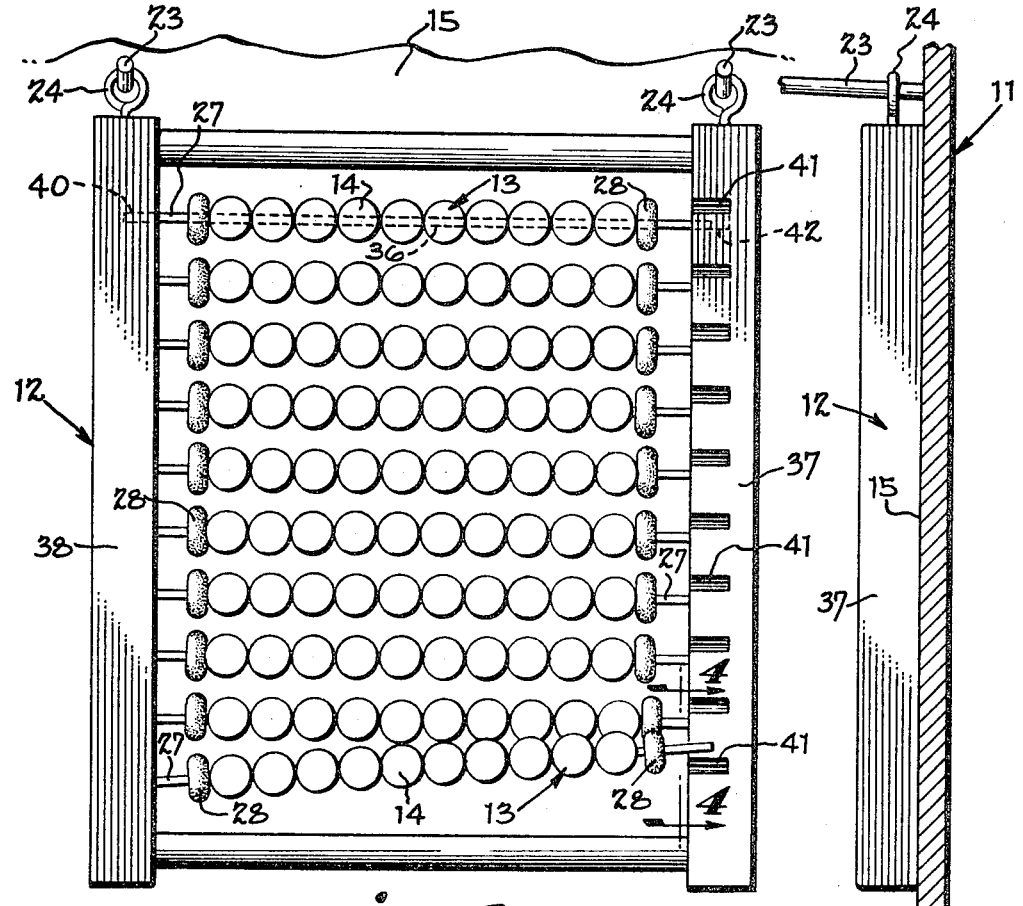
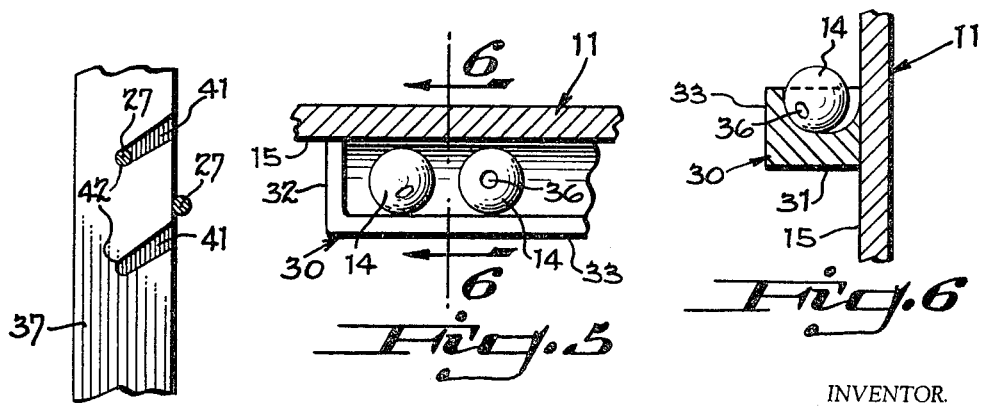
INVENTOR.
Madeline R. Rice
BY
Wood, Herron & Evans
ATTORNEYS Oct. 25, 1966  M. R. RICE  3,280,480
MATHEMATICAL TEACHING AID
Filed Aug. 19, 1965  3 Sheets-Sheet 3
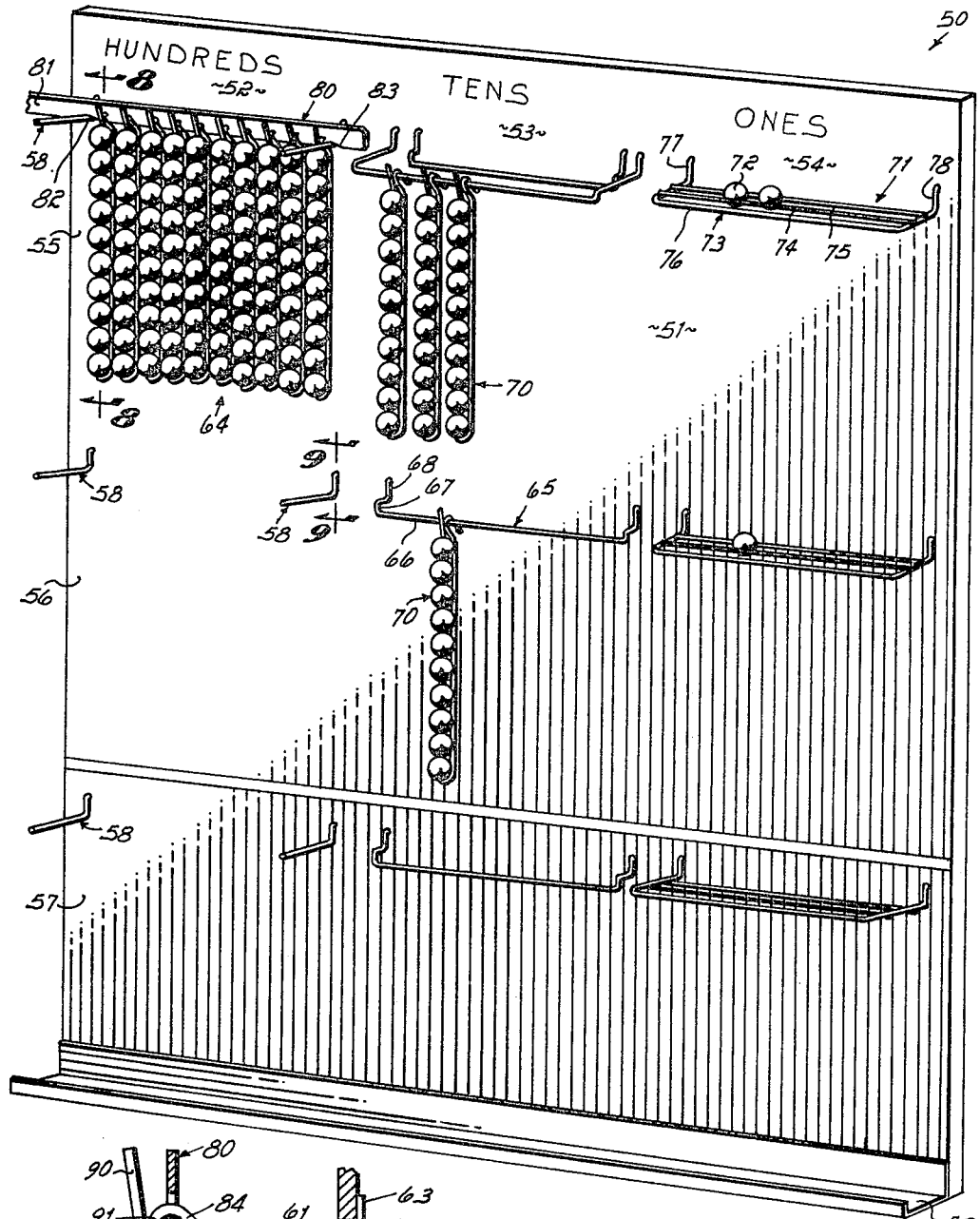
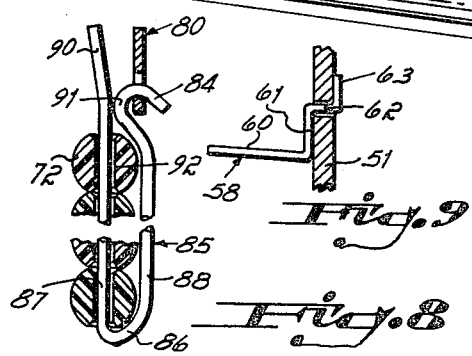
INVENTOR
Madeline R. Rice
BY
Wood, Herron & Evans
ATTORNEYS United States Patent Office 3,280,480
Patented Oct. 25, 1966

3,280,480
MATHEMATICAL TEACHING AID
Madeline R. Rice, 3728 Boomer Road, Cincinnati, Ohio
Filed Aug. 19, 1965, Ser. No. 486,254
8 Claims. (Cl. 35—31)

This invention relates to teaching aids and is particularly directed to an apparatus for visually and tactually illustrating various arithmetic relationships. This application is a continuation in part of my copendng application for Mathematical Teaching Aid Serial No. 223,059, filed September 12, 1962, now forfeited.

Many students, particularly slow learners, encounter great difficulty in mastering various concepts of elementary arithmetic. Among the concepts which are most difficult is the idea of place values, i.e., that in the number "33" the first "3" represents three "10's" or "30," while the second "3" represents three units. The related concepts of "carrying" in addition and "borrowing" in subtraction also cause considerable difficulty.

The principal object of the persent invention is to provide apparatus which clearly represents in a tangible way the place value concept, and which can be manipulated to concretely illustrate for the student basic principles of addition and subtraction, particularly the steps of "carrying" and "borrowing."

One preferred form of apparatus constructed in accordance with the principles of the present invention comprises a baseboard having three columnar areas corresponding to a "hundreds" column, a "tens" column and a "units" column. The board is also divided into three horizontal rows. In an addition problem, these rows correspond to two addends and the sum, or answer. In a subtraction problem, the rows correspond to a minuend, subtrahend and difference. Each of the rows of the "units" column is provided with a trough or the like adapted to receive and support a plurality of "units" members. In one preferred form of the invention these "units" members are balls having diametral holes therethrough.

Each of the rows in the "tens" column is provided with support members for holding a plurality of "tens" sets. Each of these "tens" sets comprises an elongated rod upon which is mounted ten "units" members. The rod is provided with means such as two releasable friction retainers, a spring abutment, or the like, for releasably holding the "units" members in place.

Each row in the "hundreds" column is provided with supports for holding a plurality of "hundreds" sets. Each "hundreds" set comprises a rigid member adapted to releasably carry ten "tens" rods. Since each rod in turn carries ten "units" members, there are one hundred "units" members in all mounted within each "hundreds" set.

In using the apparatus, a number such as "247" can be written in chalk across the top addend row with the "2" in the "hundreds" column, the "4" in the "tens" column and the "7" in the "units" column. This number can be physically represented by mounting two "hundreds" sets on the supports in the "hundreds" columns, four "tens" rods on the support members in the "tens" column and placing seven "units" members in the "units" trough. The student can readily see that each of the four "tens" rods actually carries ten "units" members so that the four "tens" rods actually represent forty units. Similarly, the student can clearly see that each of the "hundreds" sets includes ten "tens" rods or one hundred "units" members.

In a similar manner a second number, such as "185" can be writeen in the second addend row and the number illustrated by mounting one "hundreds" set in the "hundreds" column, eight "tens" rods on the "tens" support and placing five "units" members in the "units" trough.

To illustrate the process of addition, a student removes all of the "units" members from the two troughs and places them in the trough provided in the answer row of the "units" column. The student will find that he has twelve "units" members. He is able to place ten of these on a "tens" rod. This "tens" rod which represents carrying one "tens" is placed on the "tens" support of the answer row together with the rods removed from the addend rows. The student now has thirteen "tens" rods. He is able to place ten of these rods in a "hundreds" set leaving three "tens" rods in the answer row. This "hundreds" set is placed in the "hundreds" column of the answer row together with the three sets which were removed from the addend rows. Thus, the student has in effect carried one into the "hundreds" column. The student is now ready to write the answer or sum on the board from the elements present in the answer row, i.e., four "hundreds," three "tens" and two "units" or "432."

After manipulating the apparatus several times in this way, even slow students obtain a clear picture of the addition and "carrying" process. The process of subtraction and the concept of "borrowing" can be performed in a somewhat similar manner as is explained in detail below.

One of the principal advantages of the present teaching aid is that it provides a clear and readily understood demonstration of the digit place concept, of the "carrying" and "borrowing" concepts and the processes of addition and subtraction.

A second important advantage of the present invention is that the apparatus is easy to manipulate so that the student readily becomes facile in handling the apparatus and can devote his attention to the underlying principles of the steps he is carrying out manually.

A still further advantage of the present invention is that it is simple and economical to produce.

These and other objects and advantages of the present invention will be more readily apparent from a consideration of the following detailed description of the drawings illustrating a preferred embodiment of the invention.

In the drawings:

FIGURE 2 is a front elevational view of a "hundreds" carrier showing the manner in which a "tens" rod can be removed.

FIGURE 3 is a cross sectional view taken along line 3—3 of FIGURE 1.

FIGURE 4 is a cross sectional view taken along line 4—4 of FIGURE 2.

FIGURE 5 is a partial enlarged cross sectional view taken along line 5—5 of FIGURE 1.

FIGURE 6 is a cross sectional view taken along line 6—6 of FIGURE 5.

FIGURE 7 is a perspective view of a modified form of teaching aid constructed in accordance with the present invention.

FIGURE 8 is a cross sectional view taken along line 8—8 of FIGURE 7.

FIGURE 9 is a cross sectional view taken along line 9—9 of FIGURE 7.

Figure 1:
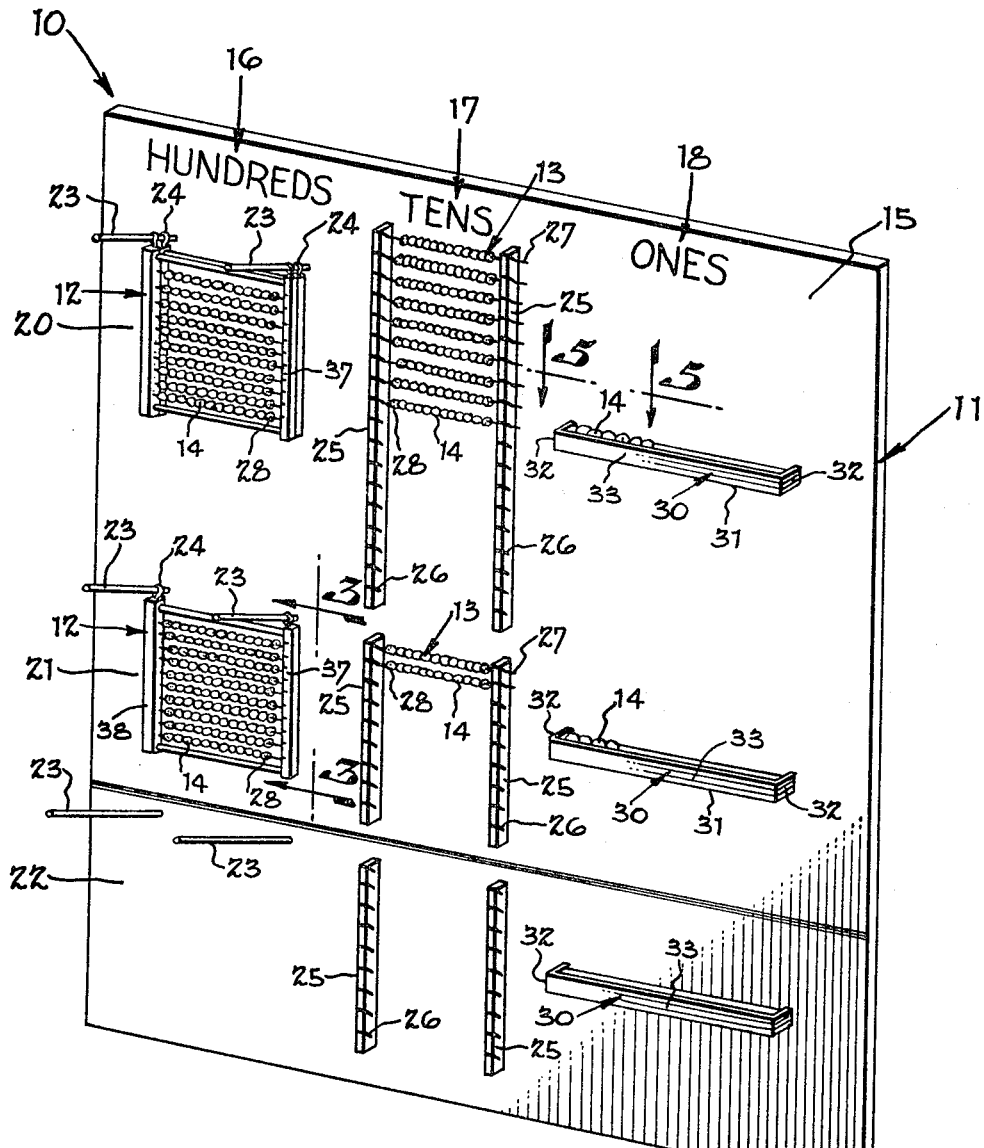
FIGURE 1 is a perspective view of one form of teaching aid constructed in accordance with the present invention.

The overall construction of one form of teaching aid 10 constructed in accordance with the principles of the present invention is best shown in FIGURE 1. As there shown, the teaching aid comprises a rectangular back board 11, a plurality of "hundreds" frames, or carriers 12, a plurality of "tens" sets 13 and a plurality of "units" members 14.

More particularly, back board 11 is a rigid rectangular board formed of wood, a synthetic slate material or the like. Preferably, the front face 15 of the board has a dark colored surface upon which numerals may be written in chalk. If desired, the rear surface of the board may be provided with hooks for suspending the board or a rearwardly extending leg for supporting it on a flat table surface.

The front face of the board is divided into three columnar areas, i.e. a "hundreds" column 16, a "tens" column 17 and a "ones" or "units" column 18. Similarly, the board is divided into three horizontal rows. When the board is used to illustrate addition, the top two horizontal rows 20 and 21 are used for the addends while the bottom row 22 is used for the answer or "sum." When the unit is used to illustrate subtraction, the top row 20 is used to represent the minuend, while the middle row 21 is used to represent the subtrahend. In this case, the lower row 22 can be used to represent the answer or "difference."

Each of the rows in "hundreds" column 16 is provided with two outwardly extending arms 23—23. These arms are positioned in spaced horizontal alignment and are adapted to receive rings 24—24 mounted upon the upper end of "hundreds" frame 12. In one preferred form of apparatus, the length of these arms is sufficient to hold nine "hundreds" frames 12.

Each of the rows in "tens" column 17 is provided with elongated, vertically extending rack members 25—25. These rack members are provided with a plurality of aligned slots 26. The slots extend rearwardly and downwardly and are adapted to receive and support the elongated rod members 27 of "tens" sets 13. The lateral spacing of rack members 25—25 is such that the racks engage the ends of the rods 27 and yet sufficient space is provided between the racks for accommodating ten "units" members 14 and two retainers 28 on each rod. The uppermost pair of racks 25—25 associated with row 20 are preferably provided with eighteen slots for accommodating up to eighteen "tens" sets. Each of the racks 25—25 in rows 21 and 22 are preferably provided with nine slots each for accommodating nine "tens" sets 13.

In the "ones" column 18, each row of the board is provided with an enlongated, horizontal trough 30 for supporting individual "units" members 14. Each of the troughs 30 includes a bottom wall 31, end walls 32—32 and front wall 33. Front wall 33 is spaced from the back board 11 a sufficient distance to permit ready insertion and removal of "units" members 14. The front wall 33 of the trough is preferably of a height such that the tops of the "units" members 14 are readily visible from the front of the board.

Each of the "units" members 14 is identical and in the embodiment shown is in the form of a spherical bead having a diametral bore 36 adapted to receive rod 27. It will, of course, be appreciated that the "units" members 14 can be made in other shapes, such as cubes, if desired.

Each of the "tens" sets 13 comprises an elongated rigid rod 27. This rod may be formed of wood, metal, plastic or the like. The rod is of a sufficient length to carry ten "units" members 14 and two retainer members 28. In the embodiment shown, each of the retainers 28 is in the form of an elastomeric washer-like member having a central opening which permits the washer to be placed over the rod. The central opening, however, is dimensioned so that a friction fit is obtained between the rod and retainer. Thus, the retainers are effective to hold the "units" members in the center of the rods. However, at least one retainer can be slipped from the rod to permit removal of the "units" members as well.

Each of the "hundreds" sets 12 comprises a rigid rectangular frame formed of wood, plastic or the like. The frame comprises two upstanding, spaced arms 37 and 38. Arm 38 is provided with ten vertically spaced openings 40 adapted to receive the ends of "tens" rods 27. The opposite arm 37 is provided with ten downwardly extending seats 41 (FIGURE 4). The bottom portion 42 of each of the slots is vertically aligned with the opposite opening 40. Consequently, when a rod 27 is inserted in a corresponding opening 40 and slot 41, the rod is supported in a horizontal position. However, the rods can readily be removed from the frame by lifting the end of the rod adjacent arm 37 and removing it from the slot 41 in the manner shown in FIGURE 2. As is best shown in FIGURES 2 and 3, each of the arms 37 and 38 carries a hook or ring 24 adapted to fit over one of the outwardly extending arms 23 carried by the back board member 11.

It will readily be appreciated that each of the "hundreds" sets 12 can be placed upon or removed from the back board 11 as a unit. Each of the "hundreds" sets carries ten "tens" sets or a total of one hundred "units" members. Each "tens" set in turn carries ten "units" members which can be removed from the rod if desired. However, the 'tens" rods can also be shifted as a unit to be assembled to form "hundreds" sets if desired.

In use, the teacher or pupil can set up a number in addend column 20 by placing "hundreds" sets, "tens" sets and "units" members in the appropriate columns corresponding to the digits of the desired number. Thus, as is shown in FIGURE 1, assume that it is desired to represent the number "297" in column 20. Two "hundreds sets 12 are placed over arms 23. Nine "tens" sets 13 are inserted between rack members 25 and seven beads 14 are placed in rack 30.

Assuming that number "124" is to be added to the number "297," "124" is represented in addend row 21 by placing one "hundreds" frame 12 on arms 23, two "tens" units on racks 25 and four beads in trough 30 of row 21. The numbers "124" and "297" can also be written in the addend rows of the back board if desired.

The student adds these numbers by removing all of the "units" members from the addend trough placing them into trough 30 of the answer or "sum" column 22. Similarly, all of the "tens" sets are removed and placed in racks 25 of answer row 22; and all of the "hundreds" frames are removed and mounted on arms 23 in row 22. It will be seen that when the "units" members 14, as shown in FIGURE 1, are placed in the bottom trough 30, there will be eleven beads altogether. The student then places ten of these beads on a rod 27. The beads are held on the rod by means of retaining washers 28 which the student slips over the ends of the rod. This rod or "tens" set is placed in rack 25 of answer row 22. This manipulation thus corresponds to the step of "carrying" "1" into the "tens" column by combining ten units in the "ones" column.

When the remaining "tens" units are brought down into the answer row, there will be twelve such "tens" units. Again, the student combines ten "tens" units into one "hundreds" unit by mounting ten of the rods 27 in a frame 12 and hanging the frame on arms 23 in the answer row. This step, of course, corresponds to the step of "carrying" "1" into the "hundreds" column by combining ten "tens." When the remaining "hundreds" frames are removed from rows 20 and 21 and placed in row 22, the student has a representation of the final answer "421," i.e. four "hundreds" carriers, two "tens" sets and one "units" member. This answer can be written in the answer row as the work proceeds.

The present apparatus can be used to illustrate the principles of subtraction and of "borrowing." By way of example, suppose that it is desired to subtract "98" from the number "297." To demonstrate the procedure involved, the teacher or pupil can set up the number "297"

in the minuend column 20 in the manner shown in FIG-URE 1. Specifically, two "hundreds" frames are placed on arms 23, nine "tens" sets are placed on racks 25 and seven "units" members are placed in trough 30. The number "297" can also be written by placing the digits "2," "9" and "7" in the "hundreds," "tens" and "ones" columns respectively immediatly below the "hundreds" sets, "tens" sets and trough 30.

In the next step the subtrahend "98" is written by placing a "9" in the "tens" column of row 21 and an "8" in the "ones" or "units" column of row 18. The "8" in the "ones" column indicates that the student is to remove eight "units" members from rack 30 in the minuend row. However, there are only seven members in the rack. Consequently, the student must "borrow" one "tens" set from the "tens" column. This is accomplished by removing one rod 17 from the "tens" rack. The retaining washer is removed from this rod and the ten individual "units" members are placed in trough 30 of the minuend row. This illustrates that when one "tens" unit is "borrowed," ten units are obtained. The student now has a total of seventeen "units" members in rack 30 and accordingly is able to remove eight of these units leaving a total of nine members 14 in the rack.

Shifting now to the "tens" column, the student must remove nine "tens" units from column 20. However, there are only eight units in the rack since one had been removed previously. The student must now "borrow" one "hundreds" unit. This is accomplished by removing frame 12 from arms 23 and physically removing the "tens" sets from the rod. These "tens" sets are placed in racks 25 in row 20. Agains, this illustrates that when one "hundreds" set is "borrowed," ten "tens" sets are obtained. The student is now able to "subtract" (i.e. remove) nine "tens" sets leaving nine "tens" sets in rack 25. One "hundreds" frame remains on arms 23 so that the answer remaining is "199." If desired, this answer can be written in answer column 22. It will, of course, be appreciated that the same problem set up on the apparatus can also be written on a conventional blackboard next to the apparatus if desired.

The construction of a modified form of teaching aid 50 embodying the principles of the present invention is shown in FIGURES 7–9. As there shown, the teaching aid comprises a rectangular backboard 51 which may be formed of any suitable material, such as chalk board or sheet installation with nylon flocking. As in the first described embodiment, the front face of the board is preferably of a dark color to provide a contrast for numerals written in chalk. Backboard 51 is preferably provided with a chalk tray 59 formed of an aluminum extrusion, or the like, and secured in any suitable manner to the lower edge of the backboard. Also, the backboard may be provided with suitable hooks (not shown) for hanging the backboard, or suitable legs (not shown) for supporting the board in a standing position from a table or the like.

The front face of this board is divided into three columnar areas, i.e. a "hundreds" column 52, a "tens" column 53 and a "ones" or "units" column 54 in the same manner as the previously described embodiment. Similarly, backboard 51 is divided into three horizontal rows, a top row 55, a middle row 56 and a lower row 57. These rows are respectively used in addition to represent two addends and a sum, or in subtraction to represent a minuend, subtrahend and difference.

Each of the rows in the "hundreds" column 52 is provided with two outwardly extending support members, or arms, 58—58. As best shown in FIGURE 9, these arms are formed of shaped wires which include outwardly extending sections 60, vertical sections 61, horizontal sections 62 which extend through suitable openings provided in backboard 51, and upstanding rearward sections 63 which abut the rear surface of the backboard. These arms 58 are disposed in horizontal alignment and are adapted to support one or more "hundreds" sets 64, the details of which are described below.

Each of the rows in the "tens" column 53 is provided with one or more support members 65. In the embodiment shown in FIGURE 7, each of these support members is in the form of a wire strip bent to form a horizontal front portion 66, horizontal arms 67 extending forwardly from the front face of board 51, vertical portions 68 and portions which extend through the backboard and engage the rear surface thereof (not shown) in the same manner as the corresponding portions of arms 58. These support members are adapted to support a plurality of "tens" units 70, the details of construction of which are described below.

Each of the rows in the "ones" column 54 is provided with a support 71 for "units" members 72. In the embodiments shown, the support 71 is in the form of a trough, or rack, formed from a plurality of spaced wires 73, 74 and 75 which are soldered or otherwise joined together. The forwardmost wire 73 is bent to include a forward horizontal section 76, vertical sections 77 and 78 and rearwardly extending sections (not shown) which pass through openings in board 51 and terminate in upwardly extending portions engaging the rear portion of the board (not shown) in the same manner as the corresponding portions of arm 58.

As is best shown in FIGURES 7 and 8, each of the "hundreds" sets 64 comprises a carrier 80 effective to support ten "tens" units 70 and hence 100 "unit" members 72. In this modification, the carrier member 80 is in the form of an elongated bar having a handle portion 81 provided with two notches 82 and 83 disposed to engage horizontal arms 58. Carrier 80 is provided with ten spaced bores, each bore being effective to receive a hook portion 84 of one of the "tens" rods 85. Thus, the "hundreds" unit is effective to support ten "tens" units 70 in the manner shown in FIGURE 7.

It will readily be appreciated that in the specific embodiment shown, the "tens" rods hang from the carrier member 80 and are removable therefrom by withdrawing the hook portions 84 from the apertures in carrier 80. If it is desirable to increase the visual impact of the "hundreds" set as an entity, the "hundreds" set shown may be modified by providing a frame around the "tens" sets or by mounting a rectangular sheet behind the "tens" sets.

The construction of the "tens" set 70 is also best shown in FIGURES 7 and 8. As there shown, each "tens" set comprises a wire rod 85 bent in generally the form of an elongated U 86 having a front arm 87 and a rear arm 88. The front arm 87 is provided at its upper end with a short, outwardly angulated section 90, while the rear arm 88 is configurated to form the hook-like portion 84. As is shown in FIGURE 8, the curved section 91 of hook portion 84 extends into close proximity with the front arm 87 of the rod. This front arm carries ten "units" members 72. In this embodiment, each of the "unit" arms is in the form of a small sphere, or bead, formed of a suitable material, such as plastic, and including an enlarged diametral bore 92 of larger diameter than the diameter of rod 85. Each of the ten "units" members 72 is mounted upon the front arm 87 of the "tens" unit by inserting the outwardly extending portion 90 of the front arm through the bore in the bead and pressing the bead downwardly. The bead then spring urges hook 84 away from the front arm until the bead passes under the hook portion at which time the hook springs back as shown in FIGURE 8 to releasably retain the beads or "units" members 72 on the "tens" rods 85.

The "units" members can be removed from the "tens" rod by slipping them upwardly along the front arm 87. As they are shifted upwardly, the beads, or "units" members cam the front arm and bead portion apart to permit removal of the beads.

It will readily be appreciated that each of the "hundreds" sets include 100 beads, i.e. ten "tens" sets, and that the "hundreds" sets can be displayed and moved as a unit. Similarly, each of the "tens" sets includes ten "units" members. Each of the "tens" sets can be displayed and moved as a unit. Also, one or more "tens" sets can be removed from the "hundreds" unit, and the "units" members can be removed from, or added to, the "tens" sets. Accordingly, the modified teaching aid shown in FIGURES 7–9 can be utilized in precisely the same way as the teaching aid previously described. Moreover, if for any reason it should be found desirable, a "tens" rod can also be hung from one of the wires 73 in the "units" receptacle, for example, during the initial step of a carrying operation.

From the foregoing disclosure of the general principles of the present invention and the above detailed description of a preferred embodiment, those skilled in the art will readily comprehend various modifications to which the invention is susceptible. For example, as was indicated previously, the "units" members could be in the form of cubes rather than round beads if desired. Obviously, a different mounting arrangement, such as a single rod and a single hook, can be provided for supporting the "hundreds" carriers. Also, only one or two "hundreds" carriers need be provided with removable "tens" sets. The remaining "hundreds" carriers could be of the same general construction and appearance except that the rods are rigidly held in place with no provision for their removal. Still other modifications will readily suggest themselves to those skilled in the art.

Moreover, while in both embodiments the teaching aid has been described in connection with the teaching of arithmetic in the decimal, i.e. base 10, system, it is contemplated that the teaching aid can also be advantageously employed to each arithmetic concept in other base systems, for example, the base system 7.

As is well understood by those skilled in the art, a unit in any base system corresponds to the base raised to the zero power. The next digit position corresponds to the base raised to the first power, i.e. in the base 10 system, the "tens" unit corresponds to $10^1$. Similarly, in the base 7 system, the corresponding unit would be $7^1$ or 7. Thus, to demonstrate arithmetic using 7 as a base, the "tens" unit should be replaced with one containing 7 beads or "units" members instead of one.

The third digit position in any number system corresponds to the base squared, i.e. the "hundreds" sets correspond to $10^2$. Thus, to illustrate arithmetic in the base 7 system, the "hundreds" set would have to be replaced with a $7^2$ set or by a set containing seven "sevens" units (49 beads in all). It will readily be apparent that this modified device can be used to demonstrate the arithmetic operations of addition and subtraction in the base 7 system in the same manner explained above. It will also be apparent that the arithmetic operations of addition and subtraction can be demonstrated in other base systems by mounting the appropriate number of beads in the sets corresponding to the "tens" sets and in the "hundreds" sets.

I claim:

1. A teaching aid comprising a back board, said back board being divided into three vertical columnar areas corresponding to a "hundreds" column, a "tens" column and a "units" column, said board having three vertically superposed spaced pairs of outwardly extending arms for supporting a plurality of "hundreds" sets in said "hundreds" column, said back board having three pairs of superposed spaced racks, each pair of racks having a plurality of aligned slots for supporting a plurality of "tens" rods in said "tens" column, and said back board being provided with three vertically superposed horizontal troughs for supporting a plurality of "units" members in said "units" column, said arms, pairs of spaced racks and troughs being thereby effective to support "hundreds" sets, "tens" rods and "units" members in a manner representing three separate numbers.

2. A teaching aid comprising a frame member, said frame member being divided into three vertical columnar areas corresponding to a "hundreds" column, a "tens" column and a "units" column, said frame member being divided into three horizontal row areas adapted to correspond to two addends and a sum, said three horizontal row areas also being adapted to correspond to a minuend, subtrahend and difference, each of said horizontal rows including two arms extending outwardly from the frame member for supporting a plurality of "hundreds" sets in said "hundreds" column, each of said rows having a pair of spaced racks, each pair of racks having a plurality of aligned slots, for supporting a plurality of "tens" rods in said "tens" column, and each of said rows further including a horizontal trough for supporting a plurality of "units" members in said "units" column.

3. A teaching aid comprising a frame member, said frame member being divided into three vertical columnar areas corresponding to a "hundreds" column, a "tens" column and a "units" column, said frame member being divided into three horizontal row areas adapted to correspond to two addends and a sum, said three horizontal row areas also being adapted to correspond to a minuend, subtrahend and difference, each of said horizontal rows including two arms extending outwardly from the frame member for supporting a plurality of "hundreds" sets in said "hundreds" column, each of said rows having a pair of spaced racks, each pair of racks having a plurality of aligned slots for supporting a plurality of "tens" rods in said "tens" column, and each of said rows further including a horizontal trough for supporting a plurality of "units" members in said "units" column, at least one of said "hundreds" sets comprising a rigid frame, ten rigid rods, means for releasably supporting said rods in parallel spaced relationship within said frame, each of said rods having ten "units" members mounted thereon, at least one of said rods having two retainer members disposed at the ends of said "units" members in frictional engagement with said rod, whereby one of said retainer members and said "units" members can be removed from said rod.

4. A teaching aid comprising a frame member, said frame member being divided into three vertical columnar areas corresponding to a "hundreds" column, a "tens" column and a "units" column, said frame member being divided into three horizontal row areas adapted to correspond to two addends and a sum, said three horizontal row areas also being adapted to correspond to a minuend, subtrahend and difference, each of said horizontal rows including two arms extending outwardly from the frame member for supporting a plurality of "hundreds" sets in said "hundreds" column, each of said rows having a pair of spaced racks, each pair of racks having a plurality of aligned slots for supporting a plurality of "tens" rods in said "tens" column, and each of said rows further including a horizontal trough for supporting a plurality of "units" members in said "units" column, at least one of said "tens" sets comprising a rigid elongated rod, ten "units" members, each of said "units" members having a bore therein for receiving said rod, said "units" members being mounted upon said rod in side-by-side relationship, a retainer member mounted upon said rod in frictional engagement therewith at one end of said ten "units" members, said retainer member and said "units" members being removable from said rod.

5. A teaching aid comprising a back board, said back board being divided into three vertical columnar areas corresponding to a "hundreds" column, a "tens" column and a "units" column, a plurality of "hundreds" sets, at least one of said "hundreds" sets comprising a rigid frame, ten rigid rods, means for releasably supporting said rods in parallel spaced relationship within said frame, each of said rods having ten "units" members mounted thereon, at least one of said rods having two retainer members disposed at the ends of said "units" members in frictional engagement with said rod, whereby one of said retainer members and said "units" members can be removed from said rod, a plurality of "tens" sets, at least one of said "tens" sets comprising a rigid elongated rod, ten "units" members, each of said "units" members having a bore therein for receiving said rod, said "units" members being mounted upon said rod in side-by-side relationship, retainer members mounted upon said rod in frictional engagement therewith in the ends of said ten "units" members, at least one of said retainer members and said "units" members being removable from said rod, said back board being divided into three horizontal row areas adapted to correspond to two addends and a sum, said three horizontal row areas also being adapted to correspond to a minuend, subtrahend and difference, each of said horizontal rows including two arms extending outwardly from the back board for supporting a plurality of "hundreds" sets in said "hundreds" column, each of said rows having a pair of spaced racks, each pair of racks having a plurality of aligned slots for supporting a plurality of "tens" rods in said "tens" column, and each of said rows further including a horizontal trough for supporting a plurality of "units" members in said "units" column.

6. A teaching aid comprising a plurality of "units" members, each of said "units" members having a bore therethrough, a plurality of "tens" sets, each of said "tens" sets including a rod for insertion within the bores of said "units" members, said rod being effective to support ten of said "units" members, at least one of said "tens" sets including means for releasably supporting said "units" members, a plurality of "hundreds" sets, each of said "hundreds" sets including a carrier for supporting ten "tens" sets, said carrier engaging the rods of said "tens" sets and being effective to hold said rods in parallel relation, at least one of said "hundreds" sets including means for releasably supporting said "tens" sets, a frame member, said frame member being divided into three vertical columnar areas corresponding to a "hundreds" column, a "tens" column and a "units" column, said frame member being divided into three horizontal row areas adapted to correspond to two addends and a sum, said three horizontal row areas also being adapted to correspond to a minuend, subtrahend and difference, each of said horizontal rows including means for supporting and visually displaying a plurality of "hundreds" sets in said "hundreds" column, each of said rows having means for supporting and visually displaying a plurality of "tens" rods in alignment with each other in said "tens" column, and each of said rows further including means for supporting and visually displaying a plurality of "units" members in said "units" column.

7. A teaching aid comprising a plurality of "units" members, each of said "units" members having a bore therethrough, a plurality of "tens" sets, each of said "tens" sets including a wire member for reception with the bores of said "units" members, each of said wire members being effective to support ten of said "units" members, each of said wire members being formed of a wire and including spaced parallel first and second arms joined together at one end to form an elongated U, said first arm having a hook formed on the free end thereof, said hook extending into close proximity with said second arm and being effective to restrain "units" members from outward movement, a plurality of "hundreds" sets, each of said "hundreds" sets including a carrier for supporting one hundred of said "units" members, a frame member, said frame member being divided into three vertical columnar areas corresponding to a "hundreds" column, a "tens" column and a "units" column, said frame member being divided into three horizontal row areas adapted to correspond to two addends and a sum, said three horizontal row areas also being adapted to correspond to a minuend, subtrahend and difference, each of said horizontal rows including means for supporting a plurality of "hundreds" sets in said "hundreds" column, each of said rows having means for supporting a plurality of "tens" sets in alignment with each other in said "tens" column, and each of said rows further including means for supporting a plurality of "units" members in said "units" column.

8. A teaching aid comprising a plurality of "units" members, each of said "units" members having a bore therethrough, a plurality of "tens" sets, each of said "tens" sets including a wire member for reception with the bores of said "units" members, each of said wire members being effective to support ten of said "units" members, each of said wire members being formed of a wire and including spaced parallel first and second arms joined together at one end to form an elongated U, said first arm having a hook formed on the free end thereof, said hook extending into close proximity with said second arm and being effective to restrain "units" members from outward movement, a plurality of "hundreds" sets, each of said "hundreds" sets including a carrier bar having apertures for engaging the hooks of said wire members, a frame member, said frame member being divided into three vertical columnar areas corresponding to a "hundreds" column, a "tens" column and a "units" column, said frame member being divided into three horizontal row areas adapted to correspond to two addends and a sum, said three horizontal row areas also being adapted to correspond to a minuend, subtrahend and difference, each of said horizontal rows including means for supporting a plurality of "hundreds" sets in said "hundreds" column, each of said rows having means for supporting a plurality of "tens" sets in alignment with each other in said "tens" column, and each of said rows further including means for supporting a plurality of "units" members in said "units" column.

References Cited by the Examiner

UNITED STATES PATENTS

| | | | |
|---|---|---|---|
| 39,740 | 9/1863 | Miller | 35—32 |
| 234,247 | 11/1880 | Classen | 35—32 |
| 3,129,518 | 4/1964 | Burris | 35—31.4 |

FOREIGN PATENTS

| | | |
|---|---|---|
| 85,743 | 3/1896 | Germany. |
| 14,905 | 6/1901 | Great Britain. |
| 22,804 | 2/1909 | Great Britain. |
| 294,368 | 1/1904 | Switzerland. |

EUGENE R. CAPOZIO, *Primary Examiner.*

W. GRIEB, *Assistant Examiner.*